(12) United States Patent
Schweighauser et al.

(10) Patent No.: US 10,778,717 B2
(45) Date of Patent: Sep. 15, 2020

(54) SYSTEM AND METHOD FOR EMAIL ACCOUNT TAKEOVER DETECTION AND REMEDIATION

(71) Applicant: Barracuda Networks, Inc., Campbell, CA (US)

(72) Inventors: Marco Schweighauser, Foster City, CA (US); Lior Gavish, San Francisco, CA (US); Itay Bleier, Sunnyvale, CA (US); Asaf Cidon, San Francisco, CA (US)

(73) Assignee: Barracuda Networks, Inc., Campbell, CA (US)

( * ) Notice: Subject to any disclaimer, the term of this patent is extended or adjusted under 35 U.S.C. 154(b) by 0 days.

(21) Appl. No.: 16/363,596

(22) Filed: Mar. 25, 2019

(65) Prior Publication Data
US 2019/0222606 A1    Jul. 18, 2019

Related U.S. Application Data

(63) Continuation-in-part of application No. 15/693,318, filed on Aug. 31, 2017.
(Continued)

(51) Int. Cl.
*H04L 29/06* (2006.01)
*G06F 9/54* (2006.01)
(Continued)

(52) U.S. Cl.
CPC .......... *H04L 63/1466* (2013.01); *G06F 9/546* (2013.01); *G06N 5/02* (2013.01);
(Continued)

(58) Field of Classification Search
CPC . H04L 63/1425; H04L 63/145; H04L 51/046; H04L 51/32; H04L 63/1416; H04L 63/1483; H04L 63/1441; H04L 63/1433; H04W 12/12; G06N 5/043; G06N 20/00; G06N 5/04; G06F 21/552; G06F 9/54;
(Continued)

(56) References Cited

U.S. PATENT DOCUMENTS 8,566,938 B1   10/2013  Prakash et al.
8,667,593 B1    3/2014  Shnitzer et al.
(Continued)

*Primary Examiner* — Jeffrey C Pwu
*Assistant Examiner* — William A Corum, Jr.

(57) ABSTRACT

A new approach is proposed that contemplates systems and methods to support email account takeover detection and remediation by utilizing an artificial intelligence (AI) engine/classifier that detects and remediates such attacks in real time. The AI engine is configured to continuously monitor and identify communication patterns of a user on an electronic messaging system of an entity via application programming interface (API) calls. The AI engine is then configured to collect and utilize a variety of features and/or signals from an email sent from an internal email account of the entity. The AI engine combines these signals to automatically detect whether the email account has been compromised by an external attacker and alert the individual user of the account and/or a system administrator accordingly in real time. The AI engine further enables the parties to remediate the effects of the compromised email account by performing one or more remediating actions.

25 Claims, 2 Drawing Sheets

Related U.S. Application Data

(60) Provisional application No. 62/778,250, filed on Dec. 11, 2018.

(51) Int. Cl.
  *H04L 12/58* (2006.01)
  *G06N 5/02* (2006.01)

(52) U.S. Cl.
  CPC ............ *H04L 51/046* (2013.01); *H04L 51/12* (2013.01); *H04L 63/1416* (2013.01)

(58) Field of Classification Search
  CPC ............... G06F 21/53; G06F 2221/034; G06F 2221/2149
  See application file for complete search history.

(56) References Cited

U.S. PATENT DOCUMENTS

| | | |
|---|---|---|
| 8,819,823 B1 | 8/2014 | Banerjee |
| 9,154,514 B1 | 10/2015 | Prakash |
| 9,501,746 B2 | 11/2016 | Prakash |
| 9,560,069 B1 | 1/2017 | Agarwal et al. |
| 9,633,201 B1 * | 4/2017 | Katz ....................... G06F 21/55 |
| 9,774,626 B1 * | 9/2017 | Himler ................ H04L 63/1483 |
| 2003/0051026 A1 | 3/2003 | Carter et al. |
| 2003/0088792 A1 | 5/2003 | Card et al. |
| 2005/0022008 A1 | 1/2005 | Goodman et al. |
| 2006/0149821 A1 | 7/2006 | Rajan et al. |
| 2007/0136810 A1 | 6/2007 | Waltermann et al. |
| 2011/0296003 A1 * | 12/2011 | McCann ................ G06F 21/316 709/224 |
| 2012/0110174 A1 | 5/2012 | Wootton et al. |
| 2015/0288717 A1 | 10/2015 | Bringsjord |
| 2016/0014151 A1 | 1/2016 | Prakash |
| 2016/0344770 A1 * | 11/2016 | Verma ................. H04L 63/1483 |
| 2017/0214701 A1 | 7/2017 | Hasan |
| 2017/0230323 A1 * | 8/2017 | Jakobsson ............... H04L 51/12 |
| 2017/0251006 A1 | 8/2017 | LaRosa et al. |
| 2018/0152471 A1 | 5/2018 | Jakobsson |
| 2018/0225605 A1 * | 8/2018 | Fabara ............. G06Q 10/0635 |
| 2018/0232741 A1 | 8/2018 | Jadhav et al. |
| 2018/0359280 A1 * | 12/2018 | Elworthy ........... H04L 63/1408 |
| 2018/0375877 A1 | 12/2018 | Jakobsson et al. |
| 2019/0028503 A1 | 1/2019 | LaRosa et al. |
| 2019/0108334 A1 * | 4/2019 | Sadaghiani ............ G06N 20/00 |
| 2019/0132273 A1 * | 5/2019 | Ryan ....................... H04L 51/12 |
| 2019/0199745 A1 * | 6/2019 | Jakobsson ........... H04L 63/1433 |

* cited by examiner

SYSTEM AND METHOD FOR EMAIL ACCOUNT TAKEOVER DETECTION AND REMEDIATION

CROSS-REFERENCE TO RELATED APPLICATIONS

This application claims the benefit of U.S. Provisional Patent Application No. 62/778,250, filed Dec. 11, 2018, and entitled "System and method for email account takeover detection and prevention," which is incorporated herein in its entirety by reference.

This application is a continuation-in-part of U.S. patent application Ser. No. 15/693,318, filed Aug. 31, 2017, and entitled "System and method for AI-based real-time communication fraud detection and prevention," which is incorporated herein in its entirety by reference.

BACKGROUND

Cyber criminals are increasingly utilizing social engineering and deception to successfully conduct wire fraud and extract sensitive information from their targets. Spear phishing, also known as Business Email Compromise, is a cyber fraud where the attacker impersonates an employee and/or a system of the company by sending emails from a known or trusted sender in order to induce targeted individuals to wire money or reveal confidential information, is rapidly becoming the most devastating new cybersecurity threat. The attackers frequently embed personalized information in their electronic messages including names, emails, and signatures of individuals within a protected network to obtain funds, credentials, wire transfers and other sensitive information. Countless organizations and individuals have fallen prey, sending wire transfers and sensitive customer and employee information to attackers impersonating, e.g., their CEO, boss, or trusted colleagues. Note that such impersonation attacks do not always have to impersonate individuals, they can also impersonate a system or component that can send or receive electronic messages. For a non-limiting example, a networked printer on a company's internal network has been used by the so-called printer repo scam to initiate impersonation attacks against individuals of the company.

One specific type of attacks, email account takeover, where an attacker steals credentials of an email account and uses the email account to attack accounts of other internal and/or external users, has been on the rise. According to a recent report issued by FBI, over $12 billion worth of assets have been lost due to business email account takeover and compromise incidents. Existing email security solutions, however, are ineffective at detecting these attacks because the emails launched from the compromised accounts come from a legitimate sender, and therefore headers of the emails contain no malicious signals. Even worse, traditional email security solutions are typically located at the gateway or firewall to the internal network, e.g., they reside between the external network and the organization's email server, and thus cannot monitor or stop internal emails. An efficient approach to deal with email account takeover attacks is needed.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
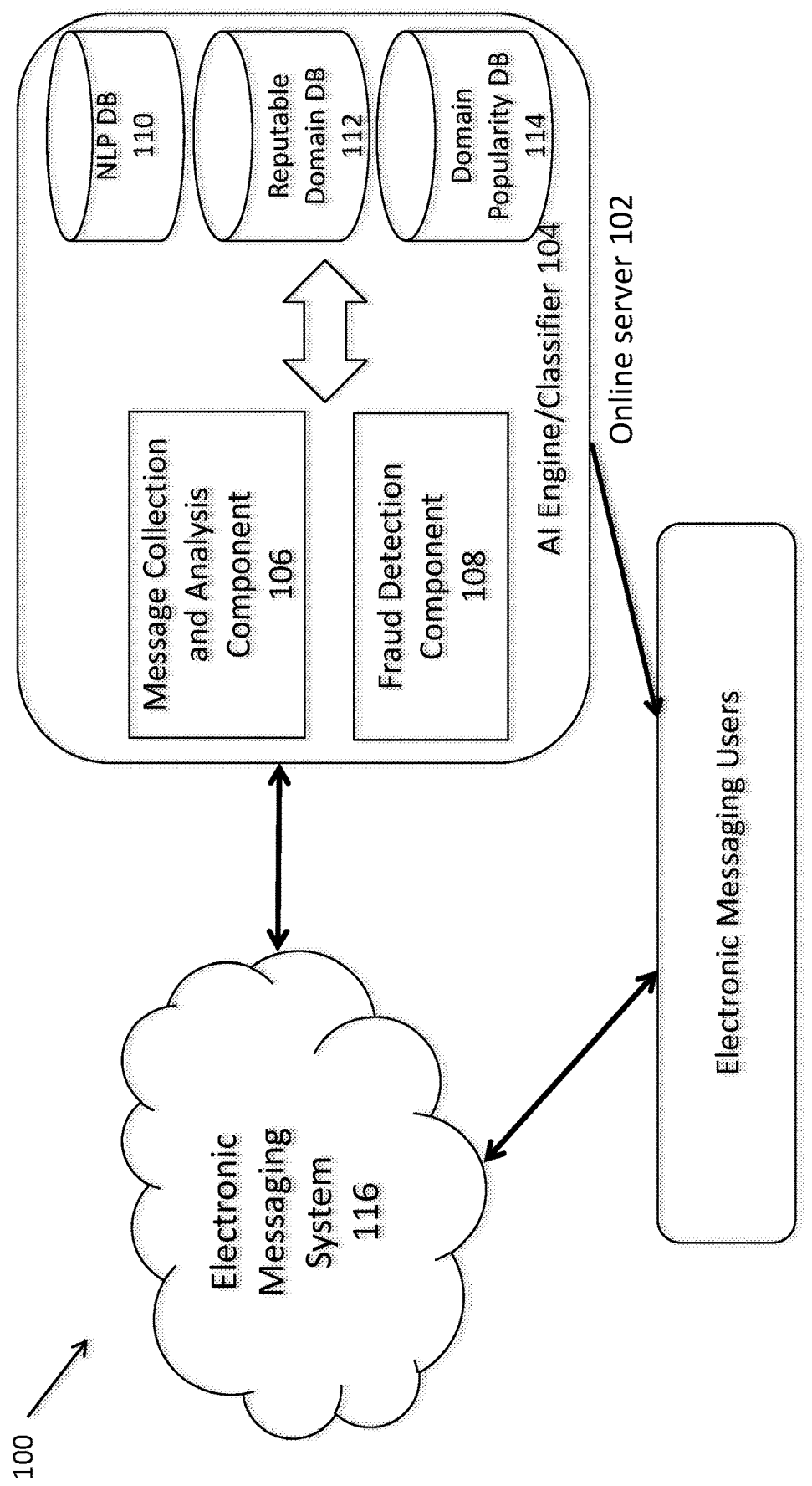
FIG. 1 depicts an example of a system diagram to support email account takeover detection and remediation in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support email account takeover detection and remediation by utilizing an artificial intelligence (AI) engine/classifier that detects and remediates such attacks in real time. The AI engine is configured to continuously monitor behaviors and identify communication patterns of an individual user on an electronic messaging system/communication platform of an entity/organization via application programming interface (API) call(s) to the electronic messaging system. Based on the identified communication patterns, the AI engine is configured to collect and utilize a variety of features and/or signals from an email sent from an internal email account of the entity, including but not limited to identities/identifications of the sender and recipients of the email, forwarding rules and IP logins to the email account, information about links embedded in the email as a function of how likely the links are to appear in the entity. The AI engine combines these signals to automatically detect whether the email account has been compromised by an external attacker and alert the individual user of the account and/or a system administrator accordingly in real time. In addition, the AI engine enables the parties to remediate the effects of the compromised email account by performing one or more of: searching for all malicious emails sent from the compromised email account, deleting or quarantining such emails from mailboxes of their recipients, notifying the recipients of the emails, and remediating any mailbox rules that the attacker may have setup on the compromised email account.

Compared to traditional gateway-based security systems that only monitor and filter external communications, the proposed approach is capable of collecting and examining internal as well as external electronic messages exchanged with parties outside of the entity to identify communication patterns of the email account of the user within the entity. The proposed approach is further capable of detecting anomalous activities and email account takeover attempts in real-time, not offline or in hindsight, and allowing the user and/or administrator of the email account to promptly remediate the adverse effects of the compromised account.

As used hereinafter, the term "user" (or "users") refers not only to a person or human being, but also to a system or component that is configured to send and receive electronic messages and is thus also subject to an email account takeover attack. For a non-limiting example, such system or component can be but is not limited to a web-based application used by individuals of the entity.

FIG. 1 depicts an example of a system diagram 100 to support email account takeover detection and remediation. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least an AI engine/classifier 104 having a message and analysis component 106 and a fraud detection component 108, and a plurality of databases including but not limited to a natural language processing (NLP) database 110, a reputable domain database 112, and a domain popularity database 114, each running on one or more computing unit/appliance/hosts/server 102 with software instructions stored in a storage unit such as a non-volatile memory (also referred to as secondary memory) of the computing unit for practicing one or more processes. When the software instructions are executed, at least a subset of the software instructions is loaded into memory (also referred to as primary memory) by one of the computing units of the host 102, which becomes a special purposed one for practicing the processes. The processes may also be at least partially embodied in the host 102 into which computer program code is loaded and/or executed, such that, the host becomes a special purpose computing unit for practicing the processes. When implemented on a general-purpose computing unit, the computer program code segments configure the computing unit to create specific logic circuits.

In the example of FIG. 1, each host 102 can be a computing device, a communication device, a storage device, or any computing device capable of running a software component. For non-limiting examples, a computing device can be but is not limited to a laptop PC, a desktop PC, a tablet PC, or an x86 or ARM-based a server running Linux or other operating systems.

In the example of FIG. 1, the electronic messaging system 116 can be but is not limited to, Office365/Outlook, Slack, LinkedIn, Facebook, Gmail, Skype, Google Hangouts, Salesforce, Zendesk, Twilio, or any communication platform capable of providing electronic messaging services to (e.g., send, receive, and/or archive electronic messages) to users within the entity 118. Here, the electronic messaging system 116 can be hosted either on email servers (not shown) associated with the entity 118 or on services/servers provided by a third party. The servers are either located locally with the entity 118 or in a cloud over the Internet. The electronic messages being exchanged on the electronic messaging system 116 include but are not limited to emails, instant messages, short messages, text messages, phone call transcripts, and social media posts, etc.

In the example of FIG. 1, the host 102 has a communication interface (not shown), which enables the AI engine 104 and/or the databases 110, 112, and 114 running on the host 102 to communicate with electronic messaging system 116 and client devices (not shown) associated with users within an entity/organization/company 118 following certain communication protocols, such as TCP/IP, http, https, ftp, and sftp protocols, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art. The client devices are utilized by the users within the entity 118 to interact with (e.g., send or receive electronic messages to and from) the electronic messaging system 116, wherein the client devices reside either locally or remotely (e.g., in a cloud) from the host 102. In some embodiments, the client devices can be but are not limited to, mobile/handheld devices such as tablets, iPhones, iPads, Google's Android devices, and/or other types of mobile communication devices, PCs, such as laptop PCs and desktop PCs, and server machines.

During the operation of the system 100, the AI engine 104 runs continuously on the host 102. As soon as one or more new/incoming messages or emails have been sent internally by one user within the entity 114 from an email account on the electronic messaging system 116 to another user within the entity 114, the message collection and analysis component 106 of the AI engine 104 is configured to collect such new electronic messages sent as well as any new login attempt and/or any new mailbox rule change to the email account in real time. In some embodiments, the message collection and analysis component 106 is configured to collect the electronic messages before the intended recipients of the electronic messages in the entity 118 receive it. In some embodiments, the AI engine 104 is optionally authorized by the entity/organization 118 via online authentication protocol (OATH) to access the more electronic messaging system 116 used by the users of the entity 118 to exchange electronic messages. In some embodiments, the message collection and analysis component 106 is configured to retrieve the electronic messages automatically via programmable calls to one or more Application Programming Interfaces (APIs) to the electronic communication system 116. Such automatic retrieval of electronic messages eliminates the need for manual input of data as required when, for a non-limiting example, scanning outgoing emails in relation to data leak prevention ("DLP") configured to scan and identify leakage or loss of data. Through the API calls, the message collection and analysis component 106 is configured to retrieve not only external electronic messages exchanged between the users of the entity 118 and individual users outside of the entity 118, but also internal electronic messages exchanged between users within the entity 118, which expands the scope of communication fraud detection to cover the scenario where security of one user within the entity 118 has been compromised during, for a non-limiting example, an email account takeover attack.

In some embodiments, the message collection and analysis component 106 is configured to identify communication patterns of each user based on collected electronic messages sent or received by the user on the electronic messaging system 116 over a certain period time, e.g., day, month, year, or since beginning of use. The electronic messages collected over a shorter or more recent time period may be used to identify a recent communication patterns of the user while the electronic messages collected over a longer period of time can be used to identify more reliable longer term communication patterns. In some embodiments, the message collection and analysis component 106 is configured to collect the electronic messages from an electronic messaging server (e.g., an on-premises Exchange server) by using an installed email agent on the electronic messaging server or adopting a journaling rule (e.g., Bcc all emails) to retrieve the electronic messages from the electronic messaging server (or to block the electronic messages at a gateway).

In some embodiments, the message collection and analysis component 106 is configured to use the unique communication patterns identified to examine and extract various features or signals from the collected electronic messages for email account takeover detection. For non-limiting examples, the electronic messages are examined for one or more of names or identifications of sender and recipient(s), email addresses and/or domains of the sender and the recipient(s), timestamp, and metadata of the electronic messages, forwarding rules and IP logins to the email account, information about links embedded in the emails as a function of how likely the links are to appear in the entity 118. In some embodiments, the message collection and analysis component 106 is further configured to examine content of the electronic messages to extract sensitive information (e.g., legal, financial, position of the user within the entity 118, etc.)

In some embodiments, the fraud detection component 108 is configured to first clean up content of the email sent from the email account by removing any headers, signatures, salutations, disclaimers, etc. from the mail. The fraud detection component 108 is then configured to utilize one or more of the following features and/or criteria that are unique to the email account to make a determination of whether the email account has been compromised (e.g., taken over by an attacker) or not:

Number of embedded links in the email sent by the email account;

Length of the longest URL in the email sent by the email account;

How likely is every single word in the email sent by the account associated with a malicious email according to the NLP database 110;

Is any of the domains in the email sent by the email account likely to be malicious, using both the scores from the reputable domain database 112 and/or the domain popularity database 114;

IP logins to the email account;

Mailbox rule changes to the email account.

In the example of FIG. 1, the NLP database 110 is configured to maintain a score for each word wherein the score represents the likelihood of the word to be associated with malicious (phishing) emails. In some embodiments, the fraud detection component 108 is configured to compute term frequency-inverse document frequency (TF-IDF) of each word offline based on a corpus of labeled malicious emails and a corpus of innocent emails to determine the likelihood of the word being malicious.

In the example of FIG. 1, the reputable domain database 112 is configured to store the likelihood of domains being legitimate for the entity 118. In some embodiments, the reputable domain database 112 includes domains that have been seen by the message collection and analysis component 106 in internal communications more than a certain number of times over a certain period of time (e.g., the last few days). If a certain domain has been seen in internal communications often during a short period of time, it is deemed to be legitimate as it is unlikely to be associated with a phishing link even if the domain a relatively unpopular domain.

In the example of FIG. 1, the domain popularity database 114 is configured to maintain statistics on popularity of domains of the electronic messages across the internet. The less popular a domain in the electronic messages is, the more likely the domain is to be a phishing link.

In some embodiments, the fraud detection component 108 is configured to detect anomalous signals/features in attributes, metadata and/or content of the retrieved electronic messages for email account takeover detection. Here, the anomalous signals include but are not limited to, a same sender using another email address for the first time, replying to someone else in the email/electronic message chain, or sudden change in number of recipients of an electronic message.

In some embodiments, the fraud detection component 108 of the AI engine 104 is configured to detect the fraudulent incoming messages that are part of a longer conversation that includes more than one electronic message, e.g., a chain of emails. Rather than simply examining the first message of the conversation, the fraud detection component 108 is configured to monitor all electronic messages in the conversation continuously in real time and will flag an electronic message in the conversation for block or quarantine at any point once a predetermined set of anomalous signals are detected.

Based on the feature and/or signals discussed above, the fraud detection component 108 is configured to determine with a high degree of accuracy whether the email account is compromised by an email account takeover attack or other kinds of communication fraud and/or former/ongoing network threats, which include but are not limited to a personalized phishing attempt which entices the recipient to click on a link which may ask them to enter their credentials or download a virus, or an attacker hijacking an internal account and using it to communicate with other users in the organization or external parties.

If the fraud detection component 108 determines that the email account has been compromised, it is configured to block (remove, delete, modify) or quarantine electronic messages sent from the compromised email account in real time, and automatically notify the user, intended recipient(s) of the electronic message and/or an administrator of the electronic communication system 116 of the email account takeover attack. In addition, the fraud detection component 108 enables the notified parties to remediate the email account takeover incident by allowing them to search for any malicious emails sent from the compromised email account, delete or quarantine such emails from mailboxes of their recipients, notify the recipients of those emails, and delete and/or reset any malicious mailbox rules, e.g., inbox forwarding rules, which the attacker may have setup on the compromised email account.

Figure 2:
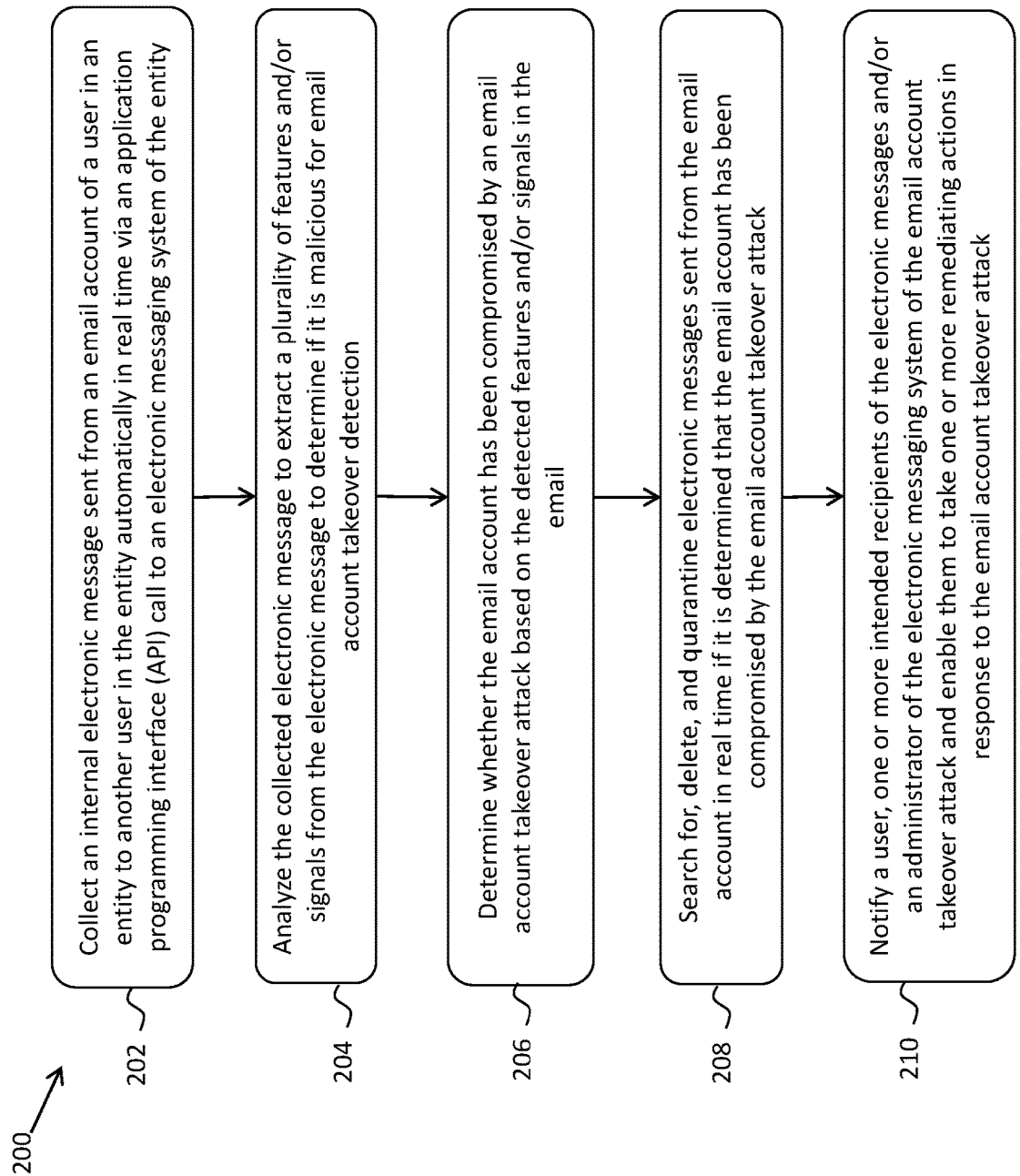
FIG. 2 depicts a flowchart of an example of a process to support email account takeover detection and remediation in accordance with some embodiments.

FIG. 2 depicts a flowchart 200 of an example of a process to support email account takeover detection and remediation. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where an internal electronic message sent from an email account of a user in an entity to another user in the entity automatically is collected in real time via an application programming interface (API) call to an electronic messaging system of the entity. The flowchart 200 continues to block 204, where the collected electronic message is analyzed to extract a plurality of features and/or signals from the electronic message to determine if it is malicious for email account takeover detection. The flowchart 200 continues to block 206, where the email account is determined with a high degree of accuracy as whether it has been compromised by an email account takeover attack based on the detected features and/or signals in the email. The flowchart 200 continues to block 208, where electronic messages sent from the email account are searched, blocked, and quarantined in real time if it is determined that the email account has been compromised by the email account takeover attack. The flowchart 200 ends at block 210, where a user, one or more intended recipients of the electronic messages and/or an administrator of the electronic messaging system are notified of the email account takeover attack and are enabled to take one or more remediating actions in response to the email account takeover attack.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system to support email account takeover detection and remediation, comprising:
    an artificial intelligence (AI) engine running on a host, which in operation, is configured to
        collect an internal electronic message sent from an email account of a user in an entity to another user in the entity automatically in real time via an application programming interface (API) call to an electronic messaging system of the entity, wherein the API is different from a gateway residing between network external to the entity and network internal to the entity;
        analyze the collected electronic message to extract a plurality of features and/or signals from the electronic message to determine if it is malicious for email account takeover detection;
        determine whether the email account has been compromised by an email account takeover attack based on the extracted features and/or signals in the electronic message including popularity of domain in the electronic message within the entity, wherein the less popular the domain in the electronic messages is, the more likely the domain has been compromised;
        search for and delete or quarantine in real time electronic messages sent from the email account if it is determined that the email account has been compromised by the email account takeover attack;
        notify a user, one or more intended recipients of the electronic messages and/or an administrator of the electronic messaging system of the email account takeover attack and enable them to take one or more remediating actions in response to the email account takeover attack;
    the AI engine is configured to compute and maintain in a database statistics on popularity of domains across the internet.

2. The system of claim 1, wherein:
the electronic messaging system is one of Office365/Outlook, Slack, LinkedIn, Facebook, Gmail, Skype, Salesforce, and any communication platform configured to send and/or receive the electronic messages to and/or from users within the entity.

3. The system of claim 1, wherein:
each user is either a person or a system or component configured to send and receive the electronic messages.

4. The system of claim 1, wherein:
the AI engine is configured to collect new login attempt and/or new mailbox rule changes to the email account in real time in addition to the electronic message.

5. The system of claim 1, wherein:
the AI engine is configured to collect the electronic message before one or more intended recipients of the electronic message in the entity receive the electronic message.

6. The system of claim 1, wherein:
the AI engine is configured to identify communication patterns of each user based on collected electronic messages sent or received by the user on the electronic messaging system over a certain period time.

7. The system of claim 1, wherein:
the plurality of extracted features and/or signals include one or more of identifications of sender and recipients of the collected electronic message, email addresses and/or domains of the sender and the recipients, timestamp, and metadata of the electronic message, forwarding rules and IP logins to the email account, information about links embedded in the emails as a function of how likely the links are to appear in the entity.

8. The system of claim 1, wherein:
the AI engine is configured to
    clean up content of the electronic message sent from the email account by removing any headers, signatures, salutations, disclaimers from the electronic message;
    utilize one or more of the features and/or criteria that are unique to the email account to make a determination of whether the email account has been compromised or not.

9. The system of claim 8, wherein:
the one or more of the features and/or criteria includes one or more of number of embedded links in the electronic message sent by the email account, length of the longest URL in the electronic message, how likely is every single word in the electronic associated with a malicious email, how likely is any of the domains in the electronic message likely to be malicious, IP logins to the email account, and mailbox rule changes to the email account.

10. The system of claim 1, wherein:
the AI engine is configured to compute offline and maintain in a database term frequency-inverse document frequency (TF-IDF) of each word based on a corpus of labeled malicious emails and a corpus of innocent emails to determine the likelihood of the word in the electronic message being malicious.

11. The system of claim 1, wherein:
the AI engine is configured to compute and maintain in a database likelihood of domains being legitimate for the entity based on domains that have been in collected electronic messages in internal communications more than a certain number of times over a certain period of time.

12. The system of claim 1, wherein:
the AI engine is configured to detect one or more anomalous signals/features in attributes, metadata and/or content of the collected electronic message for email account takeover detection.

13. The system of claim 12, wherein:
the anomalous signals include one or more of same sender using another email address for the first time, replying to someone else in an electronic message chain, and sudden change in number of recipients of an electronic message.

14. The system of claim 1, wherein:
the AI engine is configured to collect electronic messages that are a part of a conversation that includes more than one electronic message as part of the email account takeover attack.

15. The system of claim 1, wherein:
the remediating actions include deleting and/or resetting any malicious mailbox rules that the email account takeover attack has setup on the compromised email account.

16. A computer-implemented method to support email account takeover detection and remediation, comprising:
collecting an internal electronic message sent from an email account of a user in an entity to another user in the entity automatically in real time via an application programming interface (API) call to an electronic messaging system of the entity, wherein the API is different from a gateway residing between network external to the entity and network internal to the entity;
analyzing the collected electronic message to extract a plurality of features and/or signals from the electronic message to determine if it is malicious for email account takeover detection;
determining whether the email account has been compromised by an email account takeover attack based on the extracted features and/or signals in the electronic message including popularity of domain in the electronic message within the entity, wherein the less popular the domain in the electronic messages is, the more likely the domain has been compromised;
searching for and deleting or quarantining in real time electronic messages sent from the email account if it is determined that the email account has been compromised by the email account takeover attack;
notify a user, one or more intended recipients of the electronic messages and/or an administrator of the electronic messaging system of the email account takeover attack and enable them to take one or more remediating actions in response to the email account takeover attack;
computing and maintaining in a database statistics on popularity of domains across the internet.

17. The computer-implemented method of claim 16, further comprising:
collecting new login attempt and/or new mailbox rule changes to the email account in real time in addition to the electronic message.

18. The computer-implemented method of claim 16, further comprising:
collecting the electronic message before one or more intended recipients of the electronic message in the entity receive the electronic message.

19. The computer-implemented method of claim 16, further comprising:
identifying communication patterns of each user based on collected electronic messages sent or received by the user on the electronic messaging system over a certain period time.

20. The computer-implemented method of claim 16, further comprising:
cleaning up content of the electronic message sent from the email account by removing any headers, signatures, salutations, disclaimers from the electronic message;
utilizing one or more of the features and/or criteria that are unique to the email account to make a determination of whether the email account has been compromised or not.

21. The computer-implemented method of claim 16, further comprising:
computing offline and maintaining in a database term frequency-inverse document frequency (TF-IDF) of each word based on a corpus of labeled malicious emails and a corpus of innocent emails to determine the likelihood of the word in the electronic message being malicious.

22. The computer-implemented method of claim 16, further comprising:
computing and maintaining in a database likelihood of domains being legitimate for the entity based on domains that have been in collected electronic messages in internal communications more than a certain number of times over a certain period of time.

23. The computer-implemented method of claim 16, further comprising:
detecting one or more anomalous signals/features in attributes, metadata and/or content of the collected electronic message for email account takeover detection.

24. The computer-implemented method of claim 16, further comprising:
collecting electronic messages that are a part of a conversation that includes more than one electronic message as part of the email account takeover attack.

25. The computer-implemented method of claim 16, further comprising:
deleting and/or resetting any malicious mailbox rules that the email account takeover attack has setup on the compromised email account.

* * * * *